United States Patent [19]

Kaye

[11] 4,112,579
[45] Sep. 12, 1978

[54] OPTO-MECHANICAL MEASURING SYSTEM

[76] Inventor: Morton Kaye, 122 Third St., Stamford, Conn. 06905

[21] Appl. No.: 713,701

[22] Filed: Aug. 12, 1976

[51] Int. Cl.² ............................................. G01B 5/02
[52] U.S. Cl. .................................. 33/174 L; 33/178 E; 33/148 H
[58] Field of Search ............ 33/147 N, 172 E, 148 R, 33/148 H, 143 L, 125 A, 174 L, 174 R, 174 E, 178 R, 178 E, DIG. 17; 250/231 R, 231 P, 224; 356/167

[56] References Cited

U.S. PATENT DOCUMENTS

| 2,602,235 | 7/1952 | Dow | 33/172 R |
| 3,742,233 | 6/1973 | Gorgens et al. | 250/231 R |
| 3,769,713 | 11/1973 | Norman | 33/174 L |
| 3,968,364 | 7/1976 | Miller | 250/231 R |

FOREIGN PATENT DOCUMENTS

| 1,079,759 | 5/1954 | France | 33/147 N |
| 588,679 | 5/1947 | United Kingdom | 250/231 R |
| 756,064 | 8/1956 | United Kingdom | 33/174 L |

Primary Examiner—Harry N. Haroian
Attorney, Agent, or Firm—Daniel M. Rosen

[57] ABSTRACT

A measuring system includes mechanical measuring arms, adapted to engage an object to be measured, and mounted to control the positions of the vanes positioned to intercept beams of light in an optical system. The optical system includes a light beam directed to a plurality of photodetectors, whereby when the vane intercepts the light beam, the outputs of the photodetectors is a digital representation of the dimension being measured.

7 Claims, 9 Drawing Figures

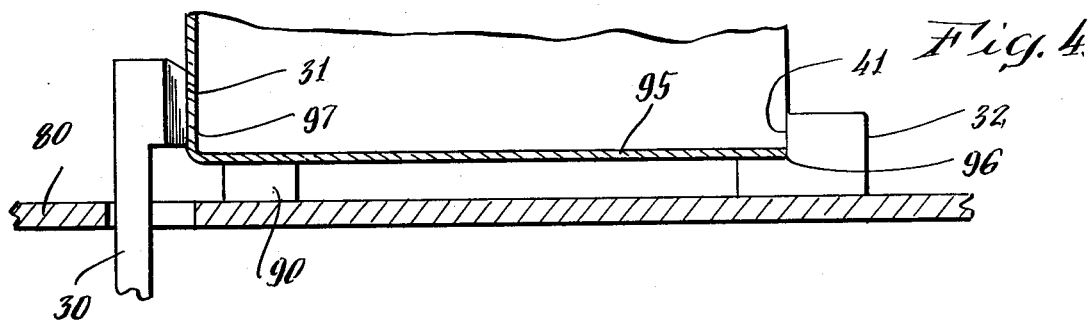
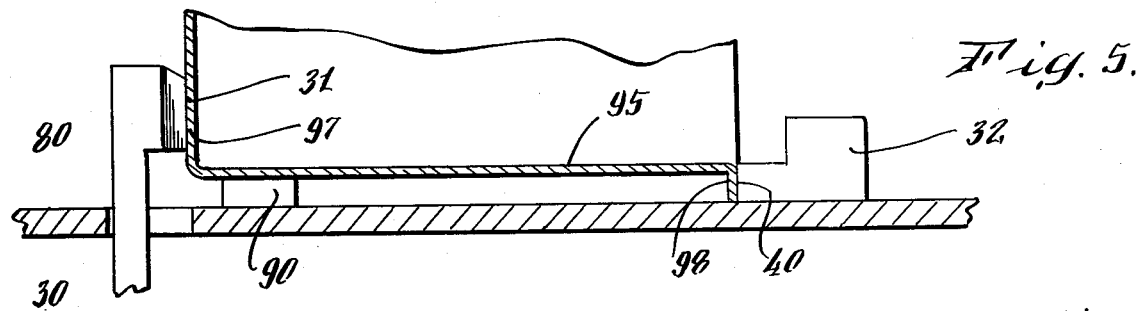
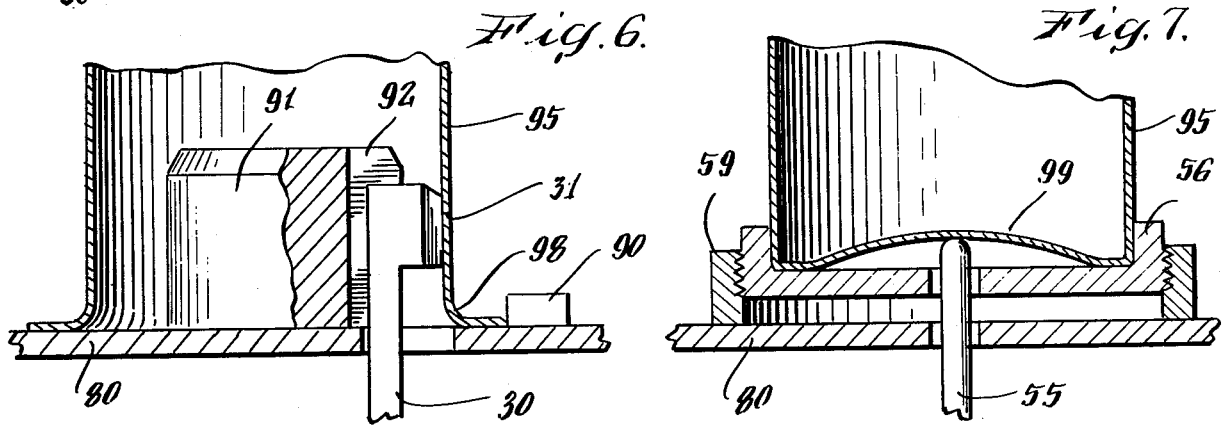
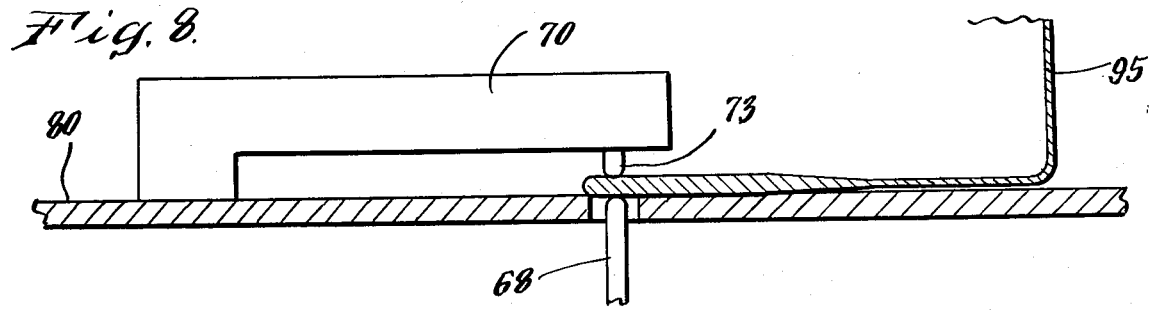
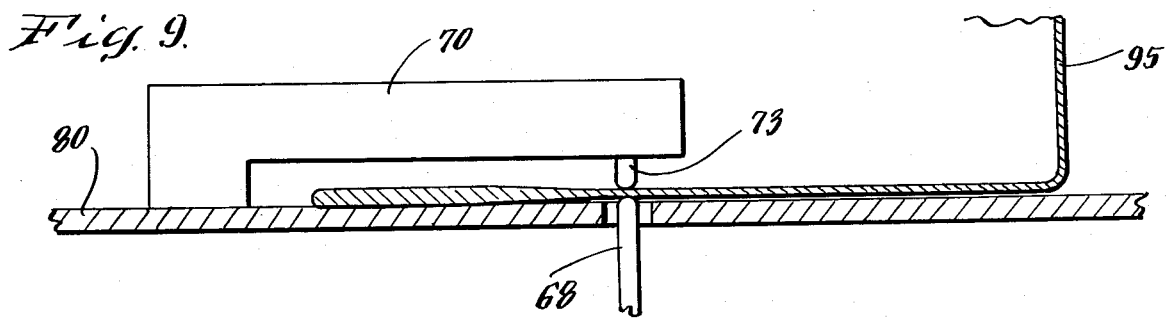

OPTO-MECHANICAL MEASURING SYSTEM

This invention relates to measuring systems, and is more particularly directed to the provision of a measuring system for ascertaining the physical dimensions of an object. It will be apparent that the measuring system of the invention is particularly adaptable to the measurement of the dimensions of cans, for example, aluminum cans, as a quality control feature in the production of such cans, although it will be apparent that the concept of the invention has further application.

In the past, various techniques have been employed for measuring the dimensions of cans, in order to insure that the cans have the proper dimensions, so that necessary steps may be taken in the production of the can, in order to avoid the production of off tolerance cans.

Such measuring techniques have generally been difficult and time consuming, and have required the use of skilled operators.

The present invention is therefore directed to the provision of a system wherein a number of types of measurements may be made on objects such as cans, by an unskilled operator, and wherein the measurements may be readily and economically taken, and may also be recorded without the need for manual writing.

Briefly stated, in accordance with the invention, a mechanical feeling system is provided, wherein mechanical calipers are mounted to engage the portions of a can to be measured. The mechanical measuring system is mechanically coupled to vanes in an optical measuring system. In the mechanical portion of the system the various calipers may be arranged, for example, to provide a pin which may project upwardly to measure the depth of the can, a measuring edge to measure the length of a can positioned between the measuring edge and a fixed stop, to measure the flange width of a can by determining the distance between a measuring edge engaging the internal wall of the can and a fixed stop, and to measure the wall thickness of the can by ascertaining the distance between a measuring pin engaging one side of the wall and a fixed pin engaging the other side of the wall of the can.

The optical portion of the measuring system includes a light source, such as an LED, with the image of the light from this source being directed to a row of photodetectors. The vanes of the mechanical system are positioned to selectively intercept the beam of light and cast a shadow onto the photodetector, whereby the output of the photodetector system may provide a digital representation of the measurement.

In a particular advantageous arrangement in accordance with the invention, the mechanical levers employed in making the various measurements may be provided with a common shaft, so that a single vane may be employed in the optical system to make a number of measurements.

In order that the invention will be more clearly understood, it will now be disclosed in greater detail with reference to the accompanying drawings, wherein:

FIG. 4 illustrates in simplified form the measurement of the length of a can having no flange;

FIG. 5 illustrates in simplified form the measurement of the length of a can having a flange;

FIG. 6 illustrates in simplified form the measurement of the width of the flange of a can;

FIG. 7 illustrates in simplified form the measurement of the depth of the bottom of a can;

FIG. 8 illustrates in simplified form the measurement of the wall thickness at the open end of a can; and FIG. 9 illustrates in simplified form the measurement of the wall thickness of a can displaced from the open end of a can, in accordance with the invention.

Figure 1:
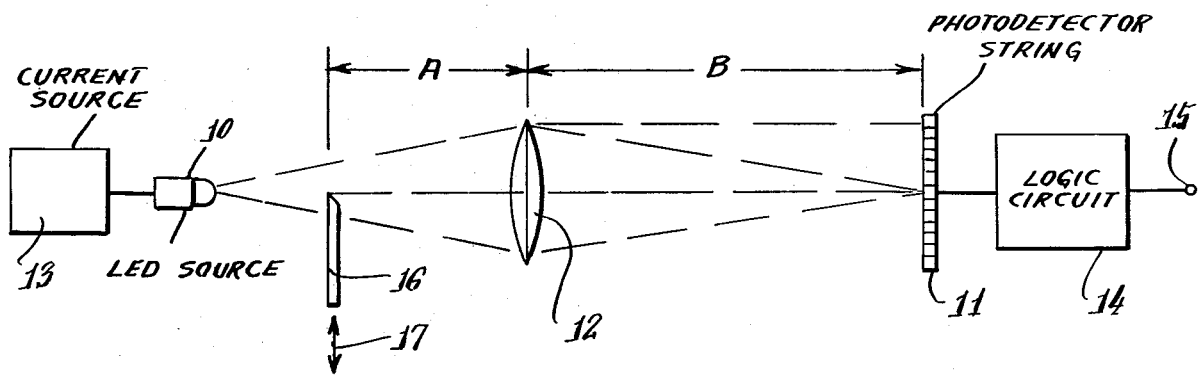
FIG. 1 is a simplified illustration of the principles of the optical portion of the measuring system in accordance with the invention.

Referring now to the drawings, and more in particular to FIG. 1, therein is illustrated a system for providing a digital output corresponding to a mechanical movement, which may be employed in the system of the invention. In this system the image of the light of light source 10 is projected on a row of photodetectors 11, by a suitable optical system indicated by the lens 12. The light source 10 may be comprised, for example, of a point light source such as an LED or a small filament lamp energized by a conventional power source 13. A logic circuit 14 is connected to the outputs of the photodetectors 11, to produce a digital output signal on the output terminal 15 corresponding to the number of energized photodetectors.

A vane 16 movable in the direction of the arrow 17 transversely of the optical axis of the detecting system, is positioned between the line of light source and the row of photodetectors, so that it may intercept the light beam to an extent, dependent upon its position.

As a consequence, it is apparent that the digital output signal at the terminal 15 will be dependent upon the position of the vane 16.

The system of FIG. 1 may be arranged to provide an "optical" advantage, by proper spacing of the elements, in order to enable the determination of the movement of the vane 16. By adjusting the spacing A and B between lens 12, object 16 and detector string 11, an optical magnification adjustment can be made to permit small insertional movements of vane 16 into the light path to create large scale shadow displacements across the photodetector string 11.

As an example, the photodetector and logic system employed in the arrangement of FIG. 1 may be a conventional digital line scan device, such as the Reticon Model RC16P digital line scan device, manufactured by the Reticon Company of Sunnyvale, Calif.

Figure 2:
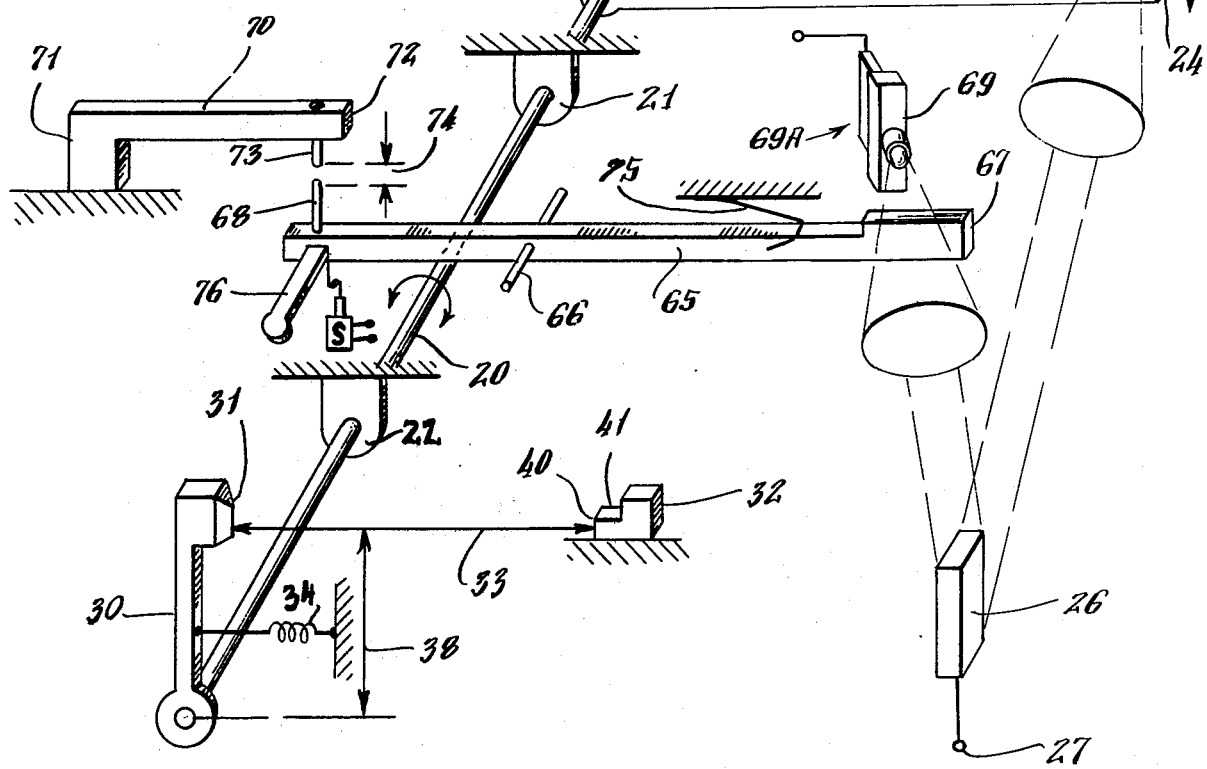
FIG. 2 is a simplified perspective illustration of the mechanical system of the invention.

FIG. 2 illustrates in simple perspective form a measuring system, enabling the sequential measurement of a number of dimensions of an object such as a can, in accordance with the invention. The apparatus includes a shaft 20 journaled for rotation, for example, in fixed bearings 21 and 22. In the preferred embodiment of the invention the shaft 20 is horizontal, although it will be apparent that this orientation is not necessary in accordance with the invention. The ground plane positions indicate these components anchored above or below the working surface, shown also in FIG. 3. A lever 23 is affixed to the shaft, and has a vane 24 positioned to selectively intercept the light beam directed between the line of light source 25, lens 25A, and a row of photodetectors 26. It is, of course, apparent that light source 25, lens 25A and photodetectors 26, as well as the vane 24, are arranged, as illustrated in FIG. 1, in a suitable optical imaging system, in accordance with conventional techniques. As a consequence, it is apparent that a digital output signal will appear in the output signal 27 of the photodetectors 26, in dependence upon the angular displacement of the shaft 20.

A measuring lever 30 is provided on the shaft 20, the lever 30 having a feeler or knife-like measuring edge 31 aligned with a fixed stop 32. A variable distance indicated by the arrow 33 exists between the stop 32 and the edge 31, in dependence upon the angular displacement of the shaft 20. The shaft 20 may be biased, for example by means of a spring 34 extending between a fixed point on the lever 30 and a ground plane, so that the measuring edge 31 is biased toward the stop 32. A further stop 90 (FIG. 3) is positioned to engage the lever 30, to thereby limit the angular displacement of the shaft 20 in the direction of the resilient bias. If the operator now inserts an object into the space 33, the measuring edge 31 is moved away from the stop 32 by the object, creating the space, and enabling the object to be placed between the measuring edge 31 and the stop 32. This enables the placement of an object to be measured between these elements such that the measuring edge 31 will engage the object, and force it toward the stop 32, with motion being stopped when the stop 32 and the measuring edge 31 both engage the object. At this time a digital signal will be produced at the terminal 27 corresponding to the final position of the arm 23 measuring edge with respect to the stop 32. The system may be calibrated so that the digital signal directly corresponds to the measured distance 33. This correspondence is, of course, dependent upon the optical advantage of the optical system, as well as upon the mechanical advantage of the system, that is, the lengths of the various levers. For example, the mechanical advantage depends upon the ratio of the length of the arm 23 to the length 38 of the arm 30 between its rotational axis and the point on the edge 31 which engages an object. In an actual embodiment of the invention, the light detector 26 was comprised of a row of photodetectors on 0.002 inch centers, and the lens and photodetectors were spaced to give a 2 to 1 optical advantage. The length of the lever 23 between the shaft 20 and the point at which the vane intercepted the light beams, was equal to the length 38 of the lever 30. As a consequence, the digital output at the terminal 27 incremented in steps corresponding to 0.001 inch variation in the distance 33.

As illustrated in FIG. 2, the stop 32 has a first edge 40 toward the measuring edge 31, as well as a stepped edge 41 further displaced from the measuring edge 31. This arrangement is particularly advantageous in the measuring of lengths of cans. For example, the lengths of cans may be measured, in an actual measuring system, either with flanges on the ends of the can, or without such flanges. The distance between the edges 40 and 41 is spaced so that a can without flanges is too long to engage the edge 40, while a flanged can will automatically engage the edge 40 since it is shorter than a nonflanged can.

In accordance with a further feature of the invention, a lever 50 is also affixed to the shaft 20, the end of the lever 50 being formed as a gear 51. A further lever 52 rotatable about an axis 53, has a gear 54 on one end thereof engaging the gear 51. A feeler or measuring pin 55 is provided on the lever 52, on the end thereof away from the gear 54.

The measuring pin 55 is particularly adapted to the measurement of the distance between the bottom of a can, and the height of the dome therein. For this purpose, the pin 55 extends upwardly and coaxially through a cup 56 having upwardly extending edges for receiving a can. Thus, a can (not shown) may be exposed in the cup 56, with its axis extending vertically, so that the bottom rim of the can engages the bottom of the cup, and the pin 55 is positioned to engage the center of the dome of the bottom of the can, the position of the pin when it engages the dome of the bottom of the can thus providing a determination of the distance 58 as indicated in FIG. 2. In this instance, it is apparent that the measurement of the distance between the bottom of the can and the dome thereof is determined by placing the can in the cup 56 which rotates the shaft 20. When the shaft 20 is thus rotated, the arm 23 will move accordingly with the top of the dome, and the digital output at the terminal 27 will hence correspond to that measured distance 58. It will be noted that the gears 51 and 54 have been provided in the system in order to reverse the direction of movement of the pin 55 with respect to that of the lever 30, so that the same measuring system may be employed for effecting both measurements. The cup 56 may be externally threaded, and fitted into a fixed threaded ring 59, to enable the calibration of the initial distance between the bottom of the cup 56 and the top of the pin 55 at its rest position. This feature enables adjustment of the depth measurement. In the above example, the lengths of the levers 23 and 50 were equal, and equal to the length of the lever 52 on each side of its axis of rotation. As a consequence, the digital output at the terminal 27 incremented in steps corresponding to 0.001 inch displacement of the pin 55.

In a still further feature of the measuring system in accordance with the invention an additional lever 65 is provided, pivoted about an axis 66. The lever 65 is movable independently of the previously discussed mechanical elements of the system. A vane 67 is provided on one end of the lever 65, and a feeler or measuring pin 68 is provided on the other end thereof. The vane 67 is positioned to selectively intercept the beams of light between a further light source 69 and lens 69A, and the row of photodetectors 26. An arm 70 has one end 71 thereof affixed to a suitable surface, with the other end 72 thereof extending in alignment with the measuring pin 68. A measuring pin 73 may be provided on the end 72 of the arm 70, to define a measuring distance 74 between the ends of the pin 73 and 68. The pin 73 may be vertically adjusted for calibration by means of an adjusting screw located directly above the pin 73 on the arm 70. The lever 65 may be biased, for example, by means of a spring 75, so that the end 68 is resiliently urged toward the pin 73. The lever 65 may be provided with an extension, such as the extension 76, to enable the operator to move the lever 65 manually in opposition to the bias of the spring 75. Preferably, however, an electrically operated solenoid S is provided for moving the lever 65 in opposition to the spring 75, in order to enable the insertion of an object to be measured at this measuring station of the apparatus. The combination of the lever 65 and the fixed arm 70 are particularly adapted for the measurement of the wall thickness of a can. Thus, upon the activation of the solenoid S by the operator, the open end of a can may be inserted over the end 72 of the fixed arm. Upon release of the solenoid S, the pin 68 will be moved upwardly, to effect the variation in the position of the vane 67, and hence the variation in the output of the detector 26. As a consequence, the digital output of the detector 26 may correspond to the dimension 74, that is, the wall thickness of the can. The fixed arm 70 has been provided in order to enable the measurement of the thickness of the wall at various positions along the length of the can, so that the thickness of the flange may be measured when the can is just inserted over the arm 70, and the thickness of the wall proper of the can may be measured when the can is moved further into the throat of the arm 70.

In order to enable use of a common detector 26, it will be apparent that suitable conventional means may be provided for selectively energizing the light sources 25 and 69. The use of the common photodetector 26 is, of course, particularly desirable, since only a single source of digital output signals is provided, thereby facilitating the incorporation of the system of the invention in a measuring apparatus. In an actual system in accordance with the invention, the source 69 is a single LED, the source 69 was positioned to provide a 5 to 1 optical advantage, and the length of the lever 65 between the axis 66 and the vane 67 was four times the length of the lever between the axis 66 and the pin 68. As a consequence, the digital output at the terminal 27 incremented in steps corresponding to 0.0001 inch displacement of the measuring pin 68 with respect to the fixed pin 73.

It will, of course, be apparent that the optical and mechanical systems may be arranged to provide other optical and mechanical advantages, respectively, as desired. While it may have been possible to measure the distance 74 by means of a further lever system affixed to the shaft 20, in accordance with the invention in view of the difference in required accuracies of measurement, it was found much more expedient to employ a separate lever 65 in combination with a separate light source 69.

The arrangement of FIG. 2 thereby provides a system whereby the various measurements may be made on a can, sequentially, for example, in order to control the quality of the cans being produced on a can making machine.

It will, of course, be apparent that the principles of measurement of the system of FIG. 2 may be incorporated in the measuring of other types of objects.

Figure 3:
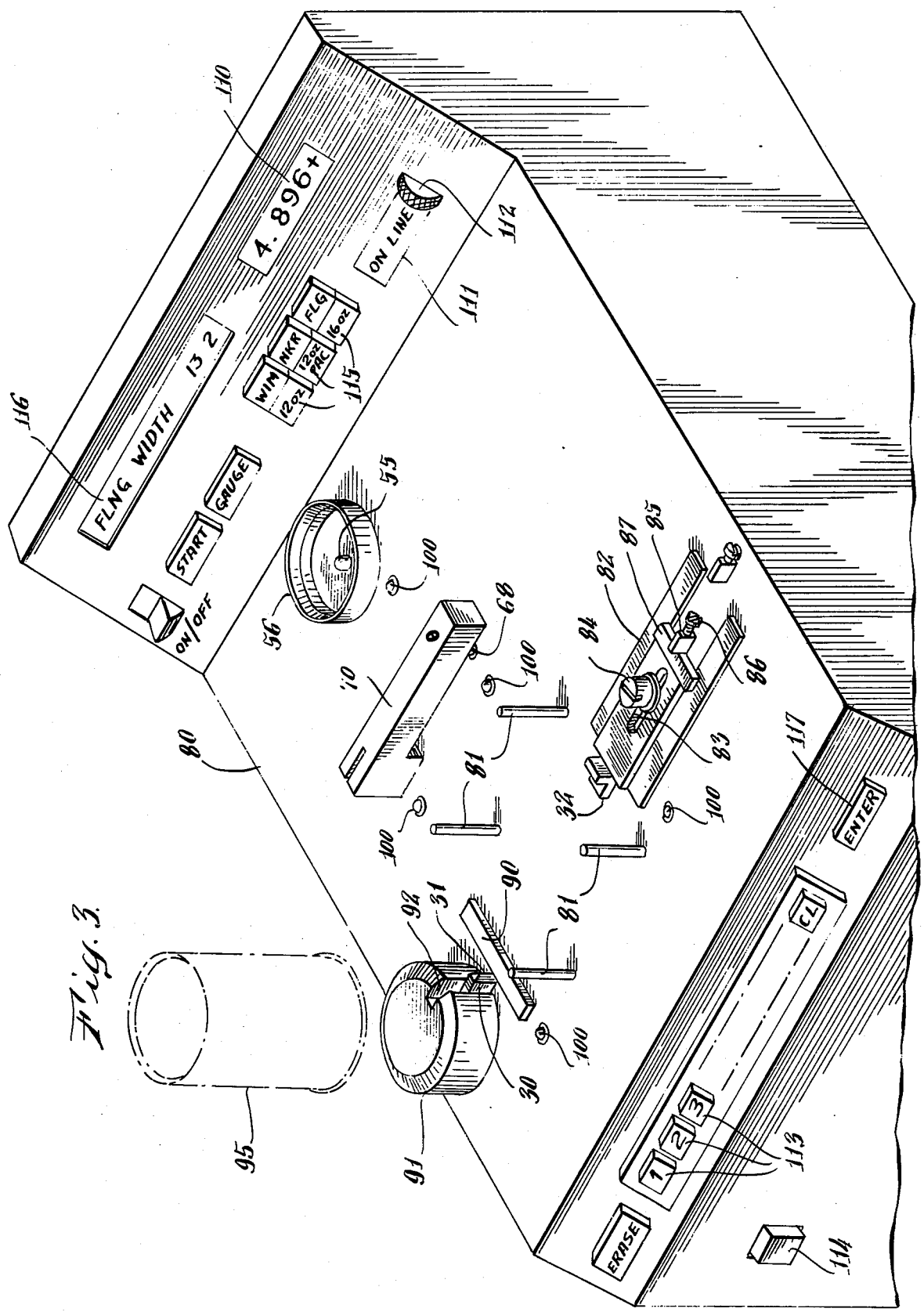
FIG. 3 is a perspective illustration of a console for a measuring system in accordance with the invention, incorporating the arrangement of FIG. 2.

FIG. 3 illustrates the external view of the console incorporating the measuring system of FIG. 2, in accordance with the invention. Referring now to FIG. 3, the housing of the console has a measuring surface 80, from which a plurality of can guide pins 81 extend vertically, to enable the horizontal positioning of the can on the surface between the guides. The lever 30 extends upwardly through a slot in the surface 80, with the measuring edge 31 thereof aligned with respect to the pins 81, to engage the bottom edge of one end of a can resting on the surface 80. The stop 32 is positioned on the surface 80 to engage the bottom edge of the other end of the can. If desired, the stop 32 may be positioned on the edge of a slide 82 having a central slot 83. A mounting screw 84 extends to the slot into the surface 80 to hold the slide 82 in position. In order to permit slight adjustments of the position of the stop 32, an abutment 85 may be provided extending from the surface 80, and having an adjustment screw 86 extending therethrough to engage a plate 87 at the end of the slide away from the stop 32. Thus, if the screw 84 is slightly loosened, the adjustment screw 86 may be adjusted to finally position the stop 32. If it is desired to measure cans of different lengths, then the surface 80 of the console may be provided with further abutments of the type of abutment 85, so that the slide 82 may be positioned at different distances from the measuring edge 31. An adjustable fixed stop in the form of an abutment 90 may be provided on the surface 80 slightly spaced from the measuring edge 31, and a cylinder 91 may be provided on the surface surrounding the projecting end of the lever 30, so that the measuring edge 31 extends through an axially extending slot 92 in the cylinder 91. With this arrangement, the open end of a flanged can may be inserted over the cylinder 91, with the radially outward edge of the flange engaging the edge of the abutment 90 toward the measuring edge 31. As a consequence, measuring edge 31 will engage the inner wall of the can, so that the position of the measuring edge 31 is dependent upon the width of the flange of the can. As a consequence, the output of the photodetector 26 of the arrangement of FIG. 2 may further provide a measurement of the flange width of the can.

The cup 56 also projects from the surface 80 with the measuring pin 55 extending upwardly to the center of the cup 56, in order to enable depth measurements on the can. In addition, the fixed arm 70 is mounted on the surface 80, with the measuring pin 68 extending upwardly through a hole in the surface 80 aligned with the fixed pin 73 on the underside of the arm 70. Thereby, the operator may lay a can on the surface 80, to slip the can over the free end of the arm 70, to enable measurement of the wall thickness of the can. The position of the upper fixed pin 73 may be adjustable, as previously described.

FIGS. 4–9 illustrate various positions of the can 95 being measured. Thus, FIG. 4 illustrates the position of the can 95, when its length is to be measured, and the open end of the can has no flange. In this measurement, the open end 96 of the can engages the edge 41 of the stop 32, whereas the bottom 97 of the can engages the measuring edge 31, so that the output of the instrument provides an indication of the height of the can.

On the other hand, when the can 95 has a flange 98 at its open end, the flange 98 engages the edge 40 of the stop 92. If the flange 98 were to be positioned to engage the edge 41, the instrument would provide no reading, since the measuring edge 31 would be positioned beyond its reading values. Similarly, a reading cannot be obtained if the unflanged edge 96 engages the edge 40 of the stop 32.

In a measurement of the flange width, as illustrated in FIG. 6, the flange 98 engages the stop 90, with the can 95 extending over the cylinder 91. The inside wall of the can 95 is engaged by the measuring edge 31.

In a measurement of the thickness at the open end of a can where a flange will be formed, as illustrated in FIG. 8, the open end of the can is inserted over the arm 70 just sufficiently that the end of the can is positioned between the measuring pin 68 and the fixed pin 73. On the other hand, as illustrated in FIG. 9, in order to measure the center wall thickness of the can, the can 95 is inserted over the arm 70 so that a more central position on the can is positioned between the measuring pin 68 and the fixed pin 73.

The console illustrated in FIG. 3 may be provided with further features. For example, lights 100 may be positioned adjacent the various measuring stations, in order to indicate to an operator the next measurement to be taken. This is particularly useful in a system wherein the measurements are to be taken in a desired sequence, for example, for recording, and the apparatus includes a programming circuit. For example, a light 100 may be positioned adjacent the stop 90, to indicate that the next measurement is to be the measurement of the width of a flange. A light 100 adjacent the slide 82 indicates that a can is to be positioned to measure the can height. A light 100 adjacent the open end of the arm 70 indicates the next measurement is to be a measurement of the thickness of the can wall at its rolled end, and a light positioned adjacent the throat of the arm 70 indicates that a can is to be positioned to measure the wall thickness at a position spaced from the end. A still further light adjacent the cup 56 indicates that the can must next be positioned in the cup 56 to enable the measurement of its depth.

A digital display 110 may be provided on the console, in order to enable the operator to see the results of the measurement. It is particularly advantageous if standard values for each of the measurements are stored in the system, whereby the display 110 indicates the deviation from the standard value, either positively or negatively. A control 114 is provided on the console to effect the release of the calipers for each measurement, thereby corresponding to the electrical release for the solenoid S of FIG. 2. Alternatively, control 114 could be used for mechanical release 76, or to mechanically rotate the lever 30 to open the measuring space 33 to accept an object.

Since various cans may have different standards, such as thicknesses of the material and size of the cans, the console may be provided with pushbuttons 115 enabling the operator to enter the particular type of can that is to be measured, so that the standard values corresponding to such cans are compared with the cans actually being measured. In addition, the console may be provided with a display 116 programmed to provide instructions to the operator, that is, to specifically identify in suitable text the next step that the operator is to perform. This display may, of course, be programmed by conventional techniques.

The measuring system in accordance with the invention thereby enables an operator to physically measure an object with a minimum contribution of time and effort. It guides the operator, on line, in a conversational mode, by use of the display 116, through a series of preprogrammed steps in the inspection operation. For individual tests, the display 111 and its thumbwheel switch 112 can operate to take the system off line, and individual measurements may be performed as desired by entering the appropriate code, shown in the display 111. The display 110 then displays each such measurement, and can also display identification of the test if desired, by entry of codes through push buttons 113. No other gauges or tools are required for the operation of the apparatus. The results of the various tests may also be recorded, by conventional techniques. Since the measuring system in accordance with the invention operates on an optical principle, it requires only very slight force on the object, such as cans, being measured. It is not necessary to activate clamps or holddowns of any kind before a measurement is to be made, and thus when a programmed console is employed, it is merely necessary to push a button, such as the "enter" control button 117, in order to enable entry of the measurement. Since the measurements are digital, they are readily understandable. It has been found that accuracies of up to 0.0001 inches may be obtained with the system. Further in actual measurements it has been found that the force exerted on the can being measured is only about 3 grams to 4 grams, so that the readings are repeatable and the walls of cans, for example, aluminum cans, are not deformed.

While the invention has been described and disclosed with reference to a single embodiment, it will be apparent that variations and modifications may be made therein, and it is therefore intended in the following claims to cover each such variation and modification as falls within the true spirit and scope of the invention.

What is claimed is:

1. An opto-mechanical system for sequentially measuring a plurality of different physical dimensions of an object, comprising a plurality of receiving means for separately receiving said object, each of said receiving means having a fixed stop for engaging a first point of said object and a movable mechanical feeler positioned to engage a second point of said object in said receiving means, whereby the position of said feeler is related to the dimension of said object between said first and second points, a plurality of photodetectors arranged closely adjacent one another in a row, light source means for projecting at least one light beam toward said photodetectors, vane means between said light source means and photodetectors, lens means for imaging said vane means on said photodetectors, and means mechanically coupling said vane means to said feelers, whereby said vane means block said light in dependence upon said distance and the output of said photodetectors constitutes a digital representation of said distance, said light source means comprising first and second light sources for directing first and second light source beams toward said photodetectors, and said vane means comprises a first vane mounted to intercept said first light beam and a second vane mounted to intercept said second light beam, said first and second vanes being mechanically coupled to be movable by first and second of said movable mechanical feelers, whereby the same photodetectors are responsive to the positions of said first and second feelers.

2. The opto-mechanical system of claim 1, further comprising a third feeler, and means mechanically coupling said third feeler to said first vane.

3. An opto-mechanical system for sequentially measuring a plurality of different physical dimensions of an object, comprising a plurality of receiving means for separately receiving said object, each of said receiving means having a fixed stop for engaging a first point of said object and a movable mechanical feeler positioned to engage a second point of said object in said receiving means, whereby the position of said feeler is related to the dimension of said object between said first and second points, a plurality of photodetectors arranged closely adjacent one another in a row, light source means for projecting at least one light beam toward said photodetectors, vane means between said light source means and photodetectors, lens means for imaging said vane means on said photodetectors, and means mechanically coupling said vane means to said feelers, whereby said vane means block said light in dependence upon said distance and the output of said photodetectors constitutes a digital representation of said distance, said light source means comprising means for directing a first light beam towards said photodetectors, said vane means comprising a vane mounted to intercept said first light beam, first and second of said mechanical feelers being coupled to move said vane, said mechanical coupling means comprising a shaft rotatable in response to movement of said first and second feelers, said shaft being coupled to move said vane in said first light beam.

4. The opto-mechanical system of claim 3, comprising means for resiliently biasing said shaft for rotation in a given direction, and means for moving said shaft in the opposite direction against said resilient bias to enable placement of objects in said receiving means.

5. The opto-mechanical system of claim 4, wherein said first feeler is directly coupled to said shaft, and further comprising gear means for coupling said second feeler to said shaft.

6. An opto-mechanical system for sequentially measuring a plurality of different physical dimensions of an object, comprising a plurality of receiving means for separately receiving said object, each of said receiving means having a fixed stop for engaging a first point of said object and a movable mechanical feeler positioned to engage a second point of said object in said receiving means, whereby the position of said feeler is related to the dimension of said object between said first and second points, a plurality of photodetectors arranged closely adjacent one another in a row, light source means for projecting at least one light beam toward said photodetectors, vane means between said light source means and photodetectors, lens means for imaging said vane means on said photodetectors, and means mechanically coupling said vane means to said feelers, whereby said vane means block said light in dependence upon said distance and the output of said photodetectors constitutes a digital representation of said distance, said receiving means comprising a cup-shaped member, said fixed stop comprising the bottom of said cup-shaped member, said fixed stop having a hole extending transversely therethrough, and wherein said feeler extends through said hole.

7. An opto-mechanical system for sequentially measuring a plurality of different physical dimensions of an object, comprising a plurality of receiving means for separately receiving said object, each of said receiving means having a fixed stop for engaging a first point of said object and a movable mechanical feeler positioned to engage a second point of said object in said receiving means, whereby the position of said feeler is related to the dimension of said object between said first and second points, a plurality of photodetectors arranged closely adjacent one another in a row, light source means for projecting at least one light beam toward said photodetectors, vane means between said light source means and photodetectors, lens means for imaging said vane means on said photodetectors, and means mechanically coupling said vane means to said feelers, whereby said vane means block said light in dependence upon said distance and the output of said photodetectors constitutes a digital representation of said distance, said receiving means comprising a surface, said fixed stop comprising a fixed arm spaced from said surface, and said feeler comprising a pin projecting through said surface and aligned with said arm, whereby an object to be measured may be placed over said arm.

* * * * *